United States Patent
Brooker

(10) Patent No.: US 6,850,362 B2
(45) Date of Patent: Feb. 1, 2005

(54) MICROSCOPE OPTICAL SYSTEM WITH A STATIONARY SAMPLE STAGE AND STATIONARY VIEWING PORTS SUITED FOR VIEWING VARIOUS FIELDS OF VIEW OF A SAMPLE

(75) Inventor: Jeff Brooker, Oakhill, VA (US)

(73) Assignee: Atto Bioscience Inc., Rockville, MD (US)

( * ) Notice: Subject to any disclaimer, the term of this patent is extended or adjusted under 35 U.S.C. 154(b) by 0 days.

(21) Appl. No.: 10/205,406

(22) Filed: Jul. 26, 2002

(65) Prior Publication Data

US 2003/0030896 A1 Feb. 13, 2003

Related U.S. Application Data

(60) Provisional application No. 60/310,494, filed on Aug. 8, 2001.

(51) Int. Cl.[7] .......................... G02B 21/18; G02B 21/00
(52) U.S. Cl. ..................... 359/379; 359/368; 359/373; 359/374
(58) Field of Search .................................. 359/368–390

(56) References Cited

U.S. PATENT DOCUMENTS

| | | | | |
|---|---|---|---|---|
| 4,290,666 A | | 9/1981 | Ruedel | 359/385 |
| 4,573,772 A | * | 3/1986 | Endo et al. | 359/370 |
| 4,714,327 A | | 12/1987 | Marshall | 359/379 |
| 4,744,642 A | | 5/1988 | Yoshinaga et al. | 359/385 |
| 5,132,837 A | | 7/1992 | Kitajima | 359/324 |
| 5,270,855 A | * | 12/1993 | Hasegawa | 359/368 |
| 5,552,928 A | | 9/1996 | Furuhashi et al. | 359/329 |
| 5,870,222 A | * | 2/1999 | Yamamoto et al. | 359/368 |
| 6,122,098 A | * | 9/2000 | Kask et al. | 359/368 |
| 6,388,788 B1 | * | 5/2002 | Harris et al. | 359/196 |
| 6,404,545 B1 | * | 6/2002 | Ishiwata | 359/371 |

* cited by examiner

*Primary Examiner*—Thong Q Nguyen
(74) *Attorney, Agent, or Firm*—Hogan & Hartson LLP

(57) ABSTRACT

A microscope optical system in which both a sample and the viewing optics can be maintained stationary, while at the same time different points or fields of view of the sample can be examined. In the microscope optical system a sample is provided, e.g. on a stage, to be maintained in a stationary position when the sample is viewed. Further, viewing optics of the microscope optical system can be maintained in a stationary position when the sample is viewed. Intermediate optics between the stage and the viewing optics are moveable so that different portions of the sample can be examined without having to move the sample and without having to move the viewing optics.

20 Claims, 8 Drawing Sheets

MICROSCOPE OPTICAL SYSTEM WITH A STATIONARY SAMPLE STAGE AND STATIONARY VIEWING PORTS SUITED FOR VIEWING VARIOUS FIELDS OF VIEW OF A SAMPLE

CROSS REFERENCE TO RELATED APPLICATIONS

The present application is based on and claims priority to U.S. Provisional Application Ser. No. 60/310,494 filed on Aug. 8, 2001, the entire contents of which are hereby incorporated herein by reference.

BACKGROUND OF THE INVENTION

1. Field of the Invention

The present invention is directed to a microscope system in which a sample being evaluated is maintained at a stationary position, but selected optics of the microscope can be moved in each of x, y, and z directions to view different fields of views of the sample, without moving the viewing ports for the microscope.

2. Discussion of the Background

A background microscope 10 structure is shown in FIG. 1. As shown in FIG. 1, in the background microscope 10 a stage 11 is provided on which a slide 12 can be placed. The slide 12 contains a sample to be viewed. As graphically represented by the arrows 17 and 18 in FIG. 1, the stage 11 is movable in both x and y directions so that it can be positioned at any x, y position.

An objective 13 is positioned either above or below the stage 11. The objective 13 is provided to focus onto a specific portion or field of view of the sample to be viewed. The objective 13 is movable in the z direction, i.e., up and down, as illustrated by the arrow 16. The image viewed by the objective 13 is provided to a mirror 14, which reflects the image into remaining microscope optics 15. The microscope optics 15 include a tube lens, viewing ports, an epi-fluorescence excitation emission if the microscope operates in fluorescence, optics and/or transmitted light optics if the microscope is a transmitted light microscope, etc.

The operation of the background microscope 10 of FIG. 1 is as follows. An operator of the microscope 10 places the sample to be viewed onto the slide 12, and secures the slide 12 onto the stage 11. The operator then moves the stage 11 in the x and y directions until the objective 13 is either directly above or directly below (depending on whether the objective is positioned above or below the sample) the desired portion of the sample to be viewed. Then the objective 13 can be moved up and down in the z direction to properly focus at the desired point or field of view on the sample.

In the background microscope 10 of FIG. 1, when the microscope operator wishes to view a different point or field of view on the sample, the operator moves the stage 11 in the x and y directions as indicated by arrows 17 and 18 to position the next desired point of the sample above or below the objective 13. When the operator desires to view further points on the sample the operator must continue to reposition the stage 111 or slide 12 so that the appropriate desired points of the sample are above or below the objective 13.

That operation of having to move the stage 11 or slide 12 to view different points on the sample in the background microscope 10 of FIG. 1, however, gives rise to certain drawbacks recognized by the inventor of the present invention. Specifically, there are instances in which a sample to be viewed is extremely delicate and in which movement of the stage 11 holding the sample or slide 12 may disrupt the sample. That may be particularly the case when a sample is being viewed at a cellular level as movements of the sample held on the stage 11 may displace or disrupt cells desired to be viewed.

Further, in the background microscope 10 of FIG. 1 there is no ability to attach microscopically sensitive devices, such as micropipettes, to a specimen as such microscopically sensitive devices would be displaced when the stage 11 is moved.

Also, the present inventor recognized that in the background microscope if multiple samples, such as contained in a multi-well plate, are to be examined, it is difficult to view kinetic reaction in the samples in the multi-well plate in real time if it is required to constantly move the samples to be beneath an objective. That results because the movement of the different samples underneath the objective may disrupt the reactions sought to be observed.

A simple dissecting microscope is also known. A simple dissecting microscope is a microscope which is small and simple and so is entirely movable. Such a simple dissecting microscope can be moved, for example by rotating around a central axis, to be positioned above an appropriate point on a sample desired to be viewed. The drawbacks with such an entirely movable microscope is that the microscope cannot be made particularly large or complicated as the entire microscope must be moved. That is, a proposition of moving an entire microscope is only feasible with simple microscopes and with microscopes that do not have any significant attachments thereto. At the present time microscopy is becoming more and more sophisticated and complicated and it is often desirable for a microscope to have very sophisticated optics, to include attachments such as cameras on the microscope, etc. Such complications make it unfeasible to move an entire microscope and maintain a sample at a stationary position.

Also, a further drawback with a microscope which can entirely move is that the viewing optics themselves must move so that the microscope operator has to constantly move around with the movement of the microscope.

SUMMARY OF THE INVENTION

Accordingly, one object of the present invention is to address the above-discussed and other drawbacks in the background art.

A more specific object of the present invention is to provide a novel microscope structure in which both a sample and the viewing optics are maintained stationary, while at the same time different portions or fields of view of the sample can be examined.

A further object of the present invention is to provide a novel microscope with a simple design in which various portions or fields of view of a sample can be examined without having to displace the sample or the viewing optics.

The present invention achieves the above and other objects by providing a novel microscope structure in which a stationary sample is provided, e.g. on a stage which can be stationary. Further, viewing optics of the microscope can also be maintained in a stationary position. However, intermediate optics between the stage and the viewing optics are movable so that different portions or fields of view of the sample can be examined without having to move the sample and without having to move the viewing optics.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
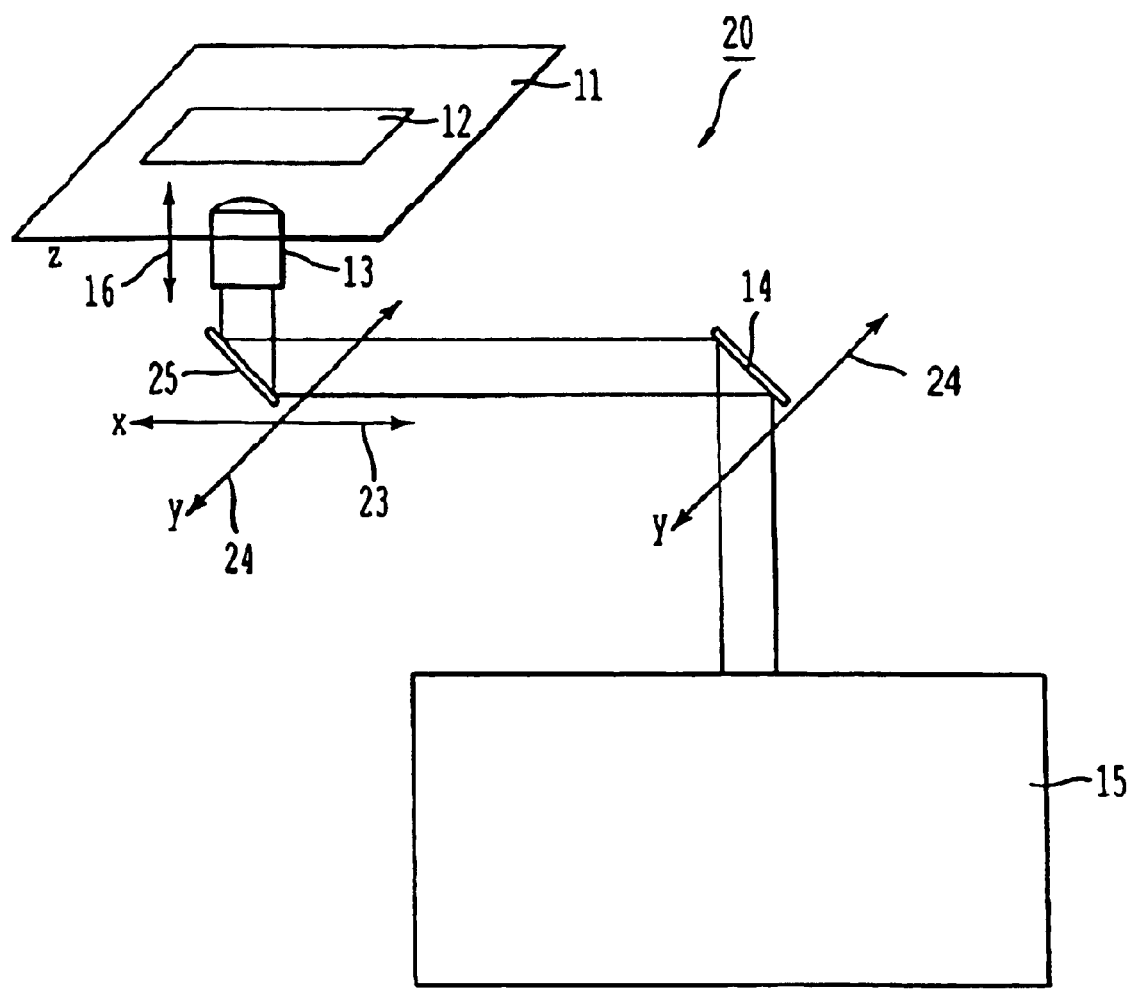
FIG. 2 schematically shows the novel microscope of the present invention in a first embodiment.

Referring now to the drawings, wherein like reference numerals designate identical or corresponding parts throughout the several views, and more particularly to FIG. 2 thereof, a schematic diagram of the novel microscope structure of the present invention is set forth.

Figure 1:
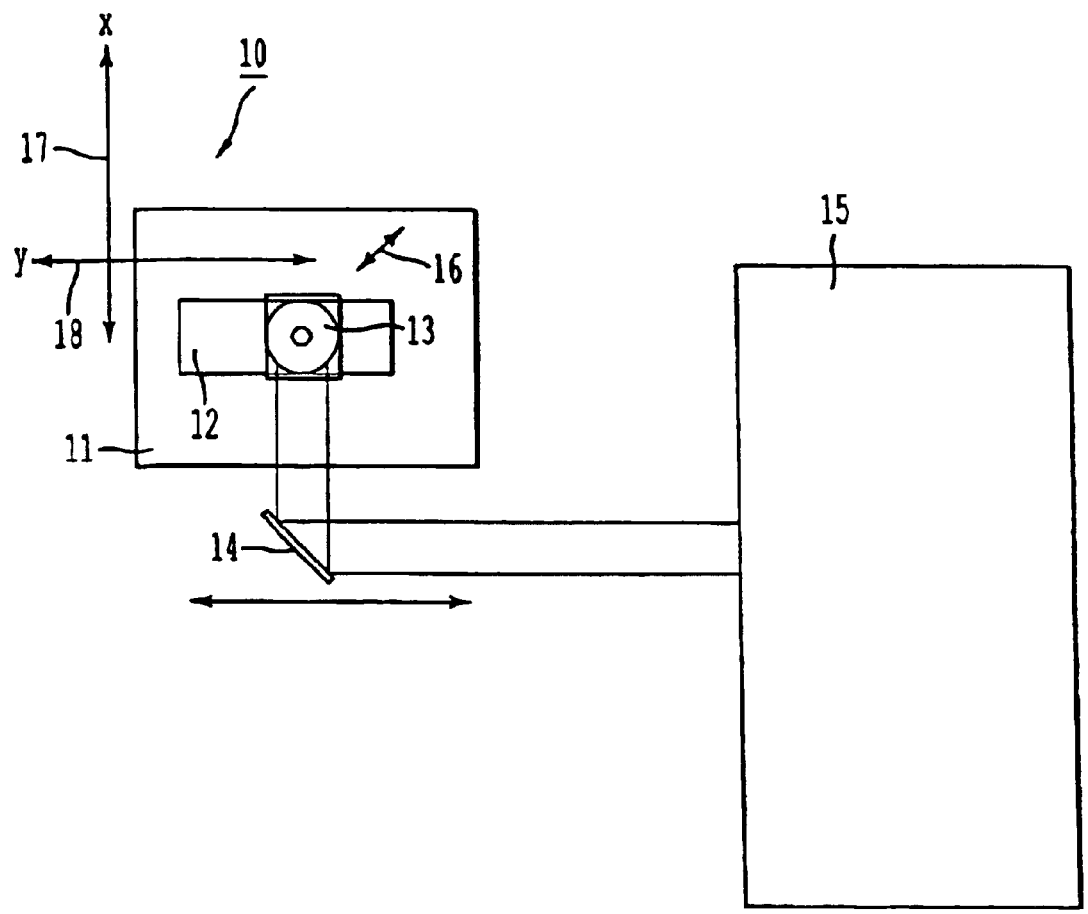
FIG. 1 shows a background microscope.

As shown in FIG. 2, the microscope 20 of the present invention is similar to the background microscope 10 of FIG. 1 in that the microscope 20 includes a stage 11 on which a slide 12 containing a sample is mounted. One difference between the microscope 20 of the present invention and the background microscope 10 of FIG. 1 is that in the present invention the stage 11 can be fixed in position while different points or fields of view on the sample are viewed, so that the sample and the slide 12 are not displaced when the sample is viewed.

In the example noted above the sample is provided on a slide 12. Significant benefits in the present invention can also be achieved if plural samples are contained in a multi-well plate, the most common of which currently being utilized is a 96 well plate. In such a multi-well plate each well contains either a same or a different sample.

The microscope 20 of FIG. 2 also includes an objective 13 which can move up and down in the z direction. An output of the objective 13 is reflected off a mirror 25, is then reflected off mirror 14, and is then provided to the microscope optics 15, which includes a tube lens and viewing ports, i.e. the optical system formed is in infinity corrected optical system. In that manner an image of the sample is provided to an operator of the microscope 20.

Microscope optics in this context could be as simple as an objective lens and a viewing port, but could include additional optical, viewing, filtering, illuminating, etc. elements.

A significant feature in the present invention with respect to the microscope 20 of FIG. 2 is the motion of the objective 13, mirror 25, and mirror 14 to provide a microscope which can move the objective 13 in any of the directions x, y, and z so that different points or fields of view on the sample on the slide 12 can be viewed, without moving the stage 11 and without moving the microscope optics 15, which include the viewing optics.

To achieve the above operation, the microscope 20 of FIG. 2 includes a structure such that the mirror 25 is coupled to the objective 13 in motion in the x and y directions 23, 24. That is, the objective 13 and the mirror 25 move in unison in both the x direction 23 and the y direction 24.

Further, the mirror 25 and the mirror 14 are coupled in motion in the y direction 24. That is, the mirror 25 and the mirror 14 move in unison in the y direction 24.

With such a structure in the present invention, the objective 13 can be moved to view any point of the sample on the slide 12 and the image of the sample is still provided to the microscope optics 15, thereby without having to displace the sample or the microscope optics 15.

As a specific example, assume that the objective 13 is positioned to view a first point at coordinates $(x_0, y_0)$ on a sample. If the objective 13 is then moved in both the x and y directions to view a different point $(x_1, y_1)$ of the sample, the mirror 25 is moved the same amount in both the x and y directions as the objective 13 to always be in a direct line with the objective 13, i.e. the mirror 25 is moved in unison with the objective 13. Further, the mirror 14 is moved the exact amount in the y direction as the mirror 25 moves in the y direction to always be aligned with the mirror 25.

With such a structure, the objective 13 can be moved in the x, y, and z directions while the sample on the stage 11 is held stationary and the microscope optics 15 are also held stationary and different points or fields of view on the sample can be imaged. With such a structure, a microscope operator can view any point of the sample without moving the sample and without having to move the viewing optics.

Such a structure in the present invention provides the significant advantages that a very sensitive sample can be viewed at multiple points without having to upset the sample. Further, microscopically sensitive devices, such as micropipettes, can be attached to the sample, and can be examined without having to potentially displace those microscopically sensitive devices by moving the sample. The uses of such a device are many.

As one specific example, a 100 micron brain slice from a rat cerebellum can be placed upon slide 12. Using ultra sensitive micropositioning equipment, three micropipettes for electrophysiological recording can be placed into a neuron in a brain slice. The pipettes with a 0.2 micron tip diameter are positioned many hundred microns apart, outside of the total field of view of the microscope objective 13 of the microscope. It may be desired to sequentially view each pipette through objective 13. Since the slide and sensitive equipment holding the micropipettes remain stationary in the novel microscope design of the present invention, the movement of objective 13 to the position of each microelectrode allows viewing of each neuroelectrode tissue area.

Another example of the utility of the novel microscope of the present invention is in the viewing of loosely adherent cells or new adherent cells which have settled to the bottom of 96, 384, or 1536 wells in multi-well plates. In a background microscope, the moving of the plate from well to well would disturb the cells, requiring a considerable waiting time for the cells to become stationary for analysis. Because the sample remains fixed and the objective moves in the present invention, one well after another can be imaged without any delay between samples.

The microscope 20 of FIG. 2 is a microscope which could operate in epi-fluorescence in that the light source in the microscope optics 15 could be a fluorescent source. The microscope of the present invention is also operable with a transmitted light source, and such a structure is shown in FIG. 3.

Figure 3:
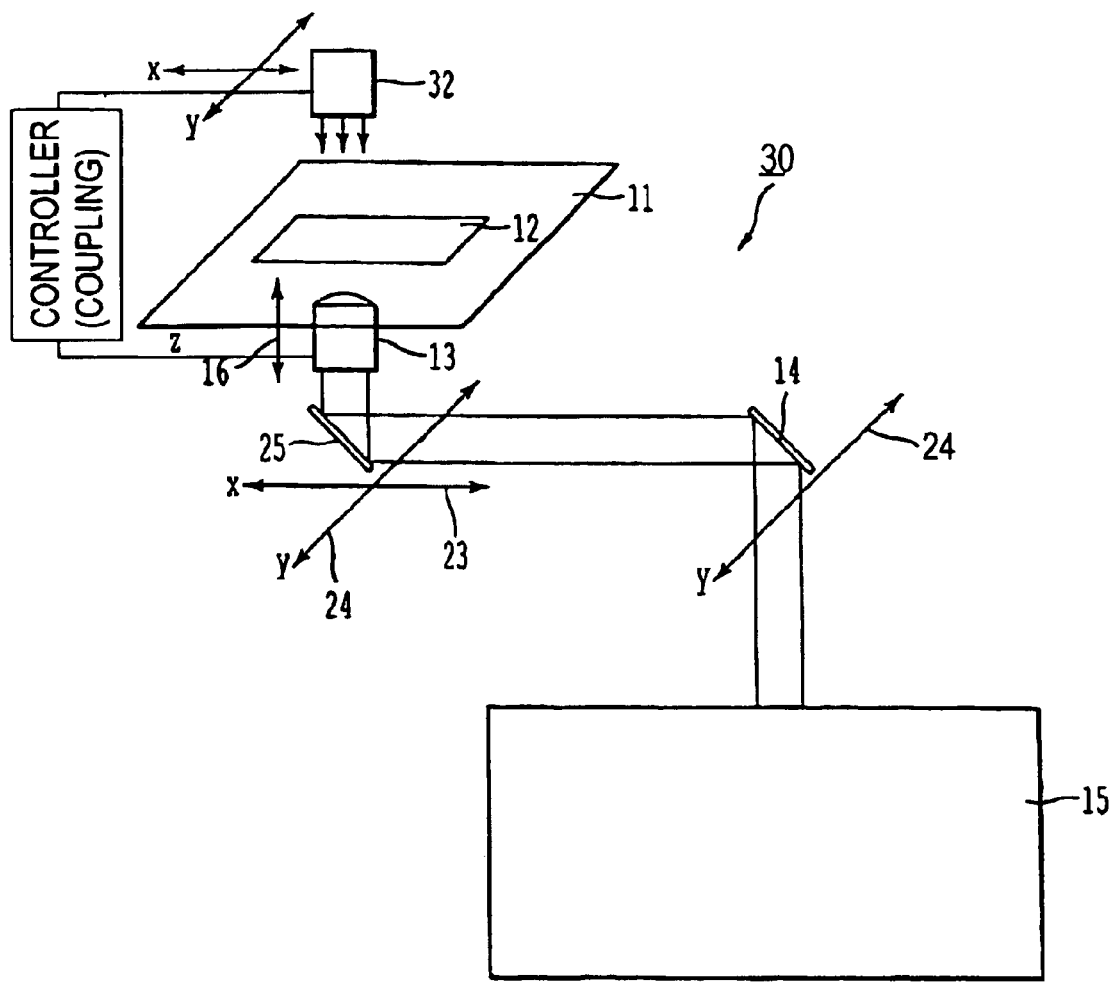
FIG. 3 schematically shows the novel microscope of the present invention in a second embodiment.

In the microscope 30 of FIG. 3 an identical structure as the microscope 20 of FIG. 2 is provided except that a light source 32 for transmitted light is also provided. One significant point with respect to the further embodiment of FIG. 3 is that the light source 32 must be coupled with the objective 13 and mirror 25 so that as the objective 13 and mirror 25 move in both the x and y directions the light source 32 moves the exact same amount in both the x and y directions.

Figure 4:
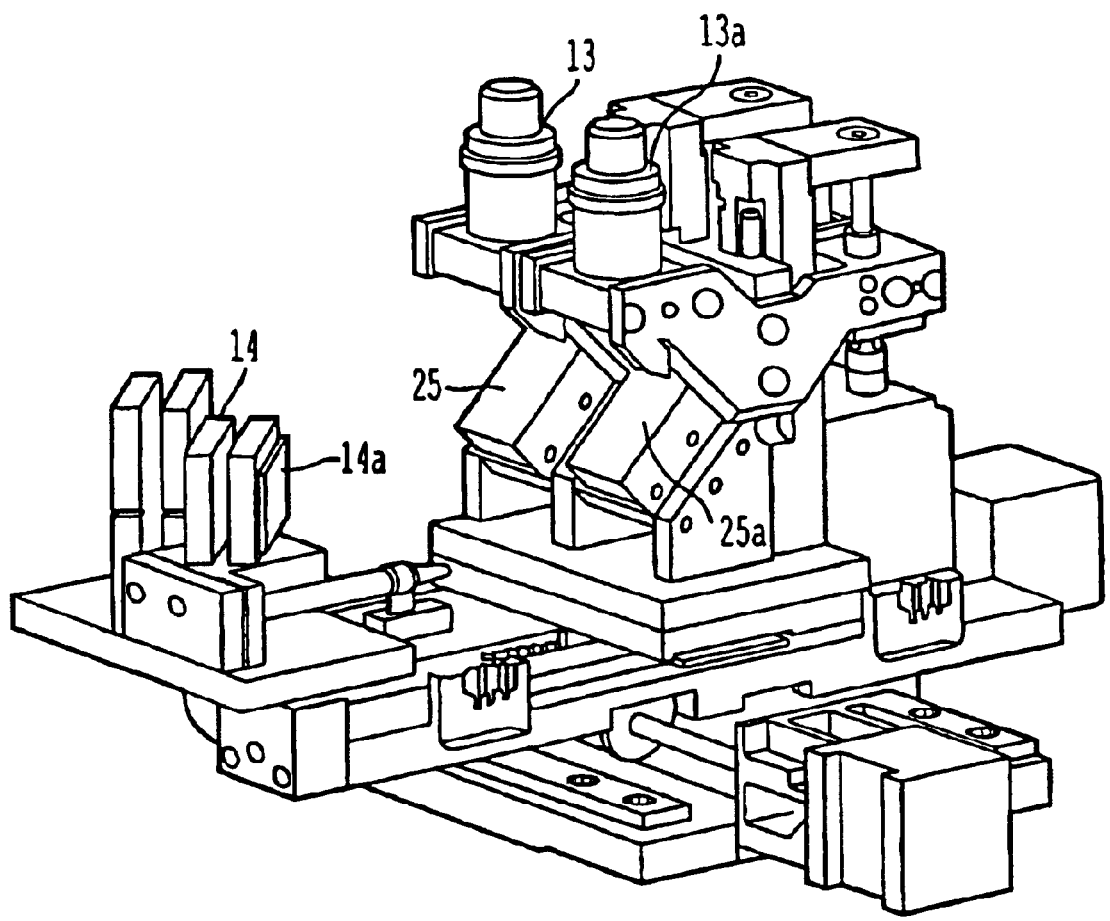
FIG. 4 shows in further structure a specific embodiment of the novel microscope of the present invention.

FIG. 4 shows a more structural embodiment of the present invention (with two objectives) indicating how in the embodiment of FIG. 2 the objective 13 and the mirror 25 are coupled in the x and y directions, and how the mirror 25 and the mirror 14 are coupled in the y direction.

As shown in FIG. 4, both the objectives 13, 13a and the mirror 25, 25a are provided on a single plate which can move on tracks in both the x and y directions. Similarly, the mirrors 14, 14a and the mirrors 25, 25a are mounted on plates which can move only along a track in the y direction. With such a structure, any movement of the objectives 13, 13a in the x or y direction results in an identical movement in the mirrors 25, 25a in the x and y directions. Similarly, any movement in the mirrors 25, 25a in the y direction results in an identical movement in the mirrors 14, 14a in the y direction.

Figure 5:
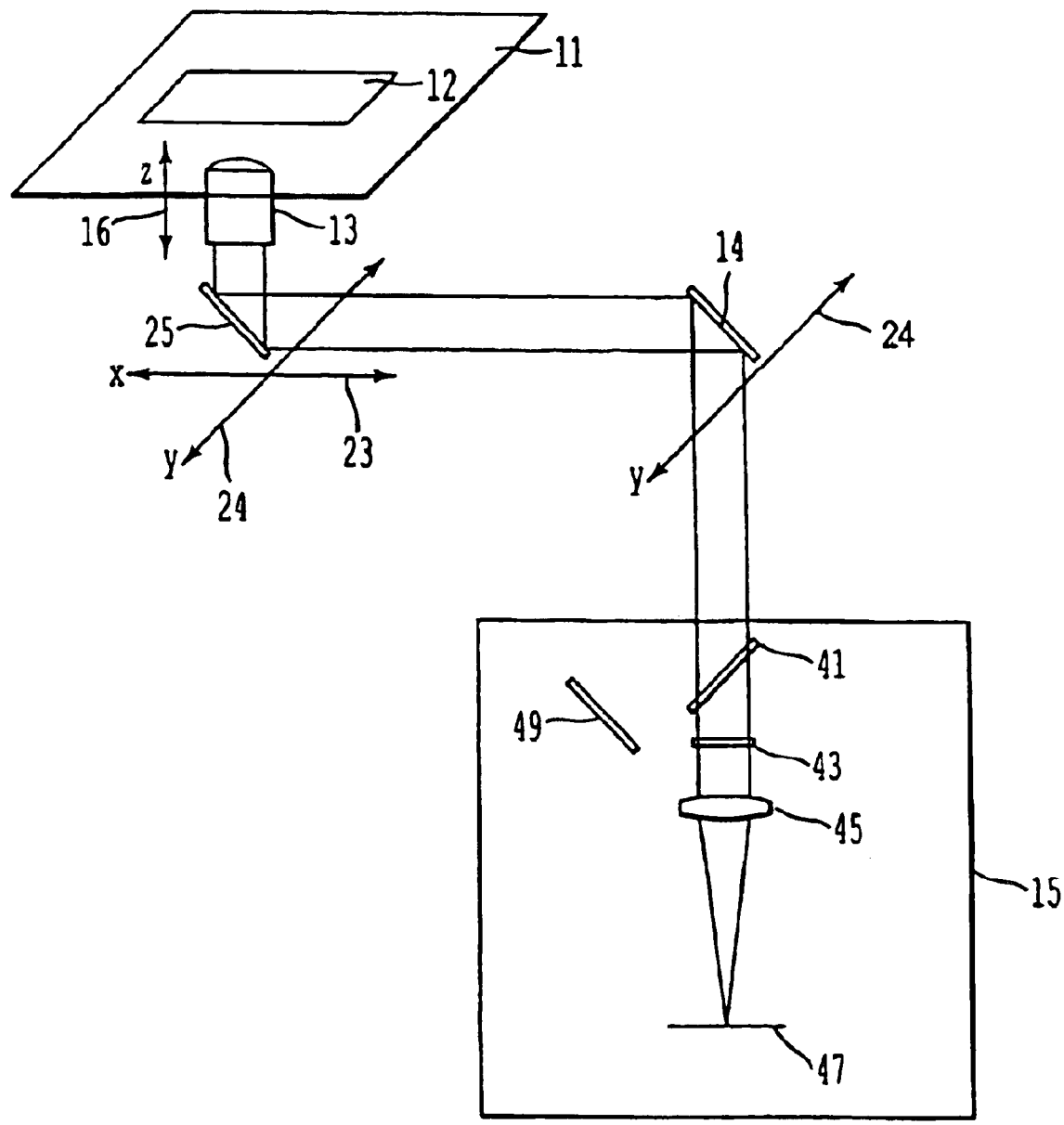
FIG. 5 shows a specific implementation of a novel microscope structure of the present invention.

FIG. 5 shows one specific configuration which the microscope optics 15 can take. In the specific embodiment shown in FIG. 5 the microscope optics 15 include an excitation filter 49 through which excitation light, e.g. from a fluorescence light source, is input. That excitation light is reflected off a dichroic mirror 41 towards the mirror 14. Further, output light of the image reflecting off the mirror 14 will pass through the dichroic mirror 41, through an emission filter 43, through a tube lens 45, and onto an observation point 47.

As noted above, with the structure in the present invention the observation point 47 can be maintained stationary, as well as the stage 11 being maintained stationary while different points on a sample are viewed, so that an operator of the microscope need not change his or her viewing position while changing a viewing point on a sample.

The embodiment of FIG. 5 shows the dichroic mirror 41, emission filter 43, and excitation filter 49 on the left hand side of the tube lens 45, although microscope structures are also known in which those elements are provided on the right hand side of the tube lens 45, and such a modification could also be implemented in the present invention.

Figure 6:
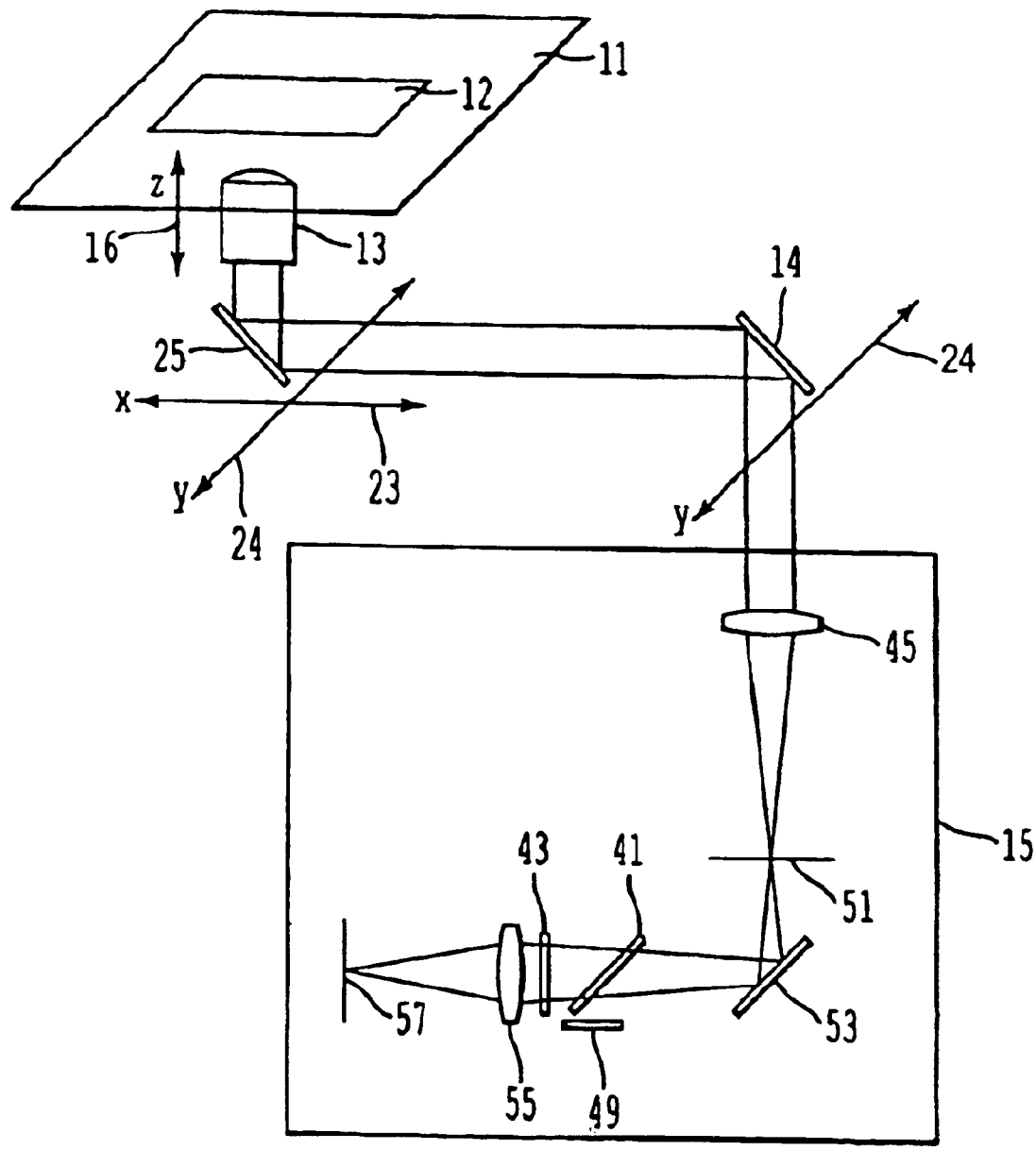
FIG. 6 shows a further specific implementation of a novel microscope of the present invention.

FIG. 6 shows a second specific microscope structure which can be utilized in the present invention which is similar to that as disclosed in Applicants' U.S. Pat. No. 6,147,798, the entire contents of which are hereby incorporated herein by reference.

In the specific microscope structure of FIG. 6 the microscope optics include the tube lens 45, a spinning disk 51, a mirror 53. The mirror 53 is, however, optional if the viewing optics are provided in a straight line rather than at a right angle. The specific microscope structure of FIG. 6 also includes a viewing point 57, a focusing lens 55 which focuses light onto the spinning disk 51, and then the excitation filter 49, dichroic mirror 41, and emission filter 43. The same benefits of the other embodiments are also applicable to the specific microscope structure of FIG. 6.

Of course the specific structures of the microscope optics 15 shown in FIGS. 5 and 6 are only examples of microscope optics which can be utilized in the present invention, and other structures of the microscope optics are possible. As one variation the microscopes of FIGS. 5 and 6 can be utilized with transmitted light sources as shown in FIG. 3, and other variations are possible.

Figure 7:
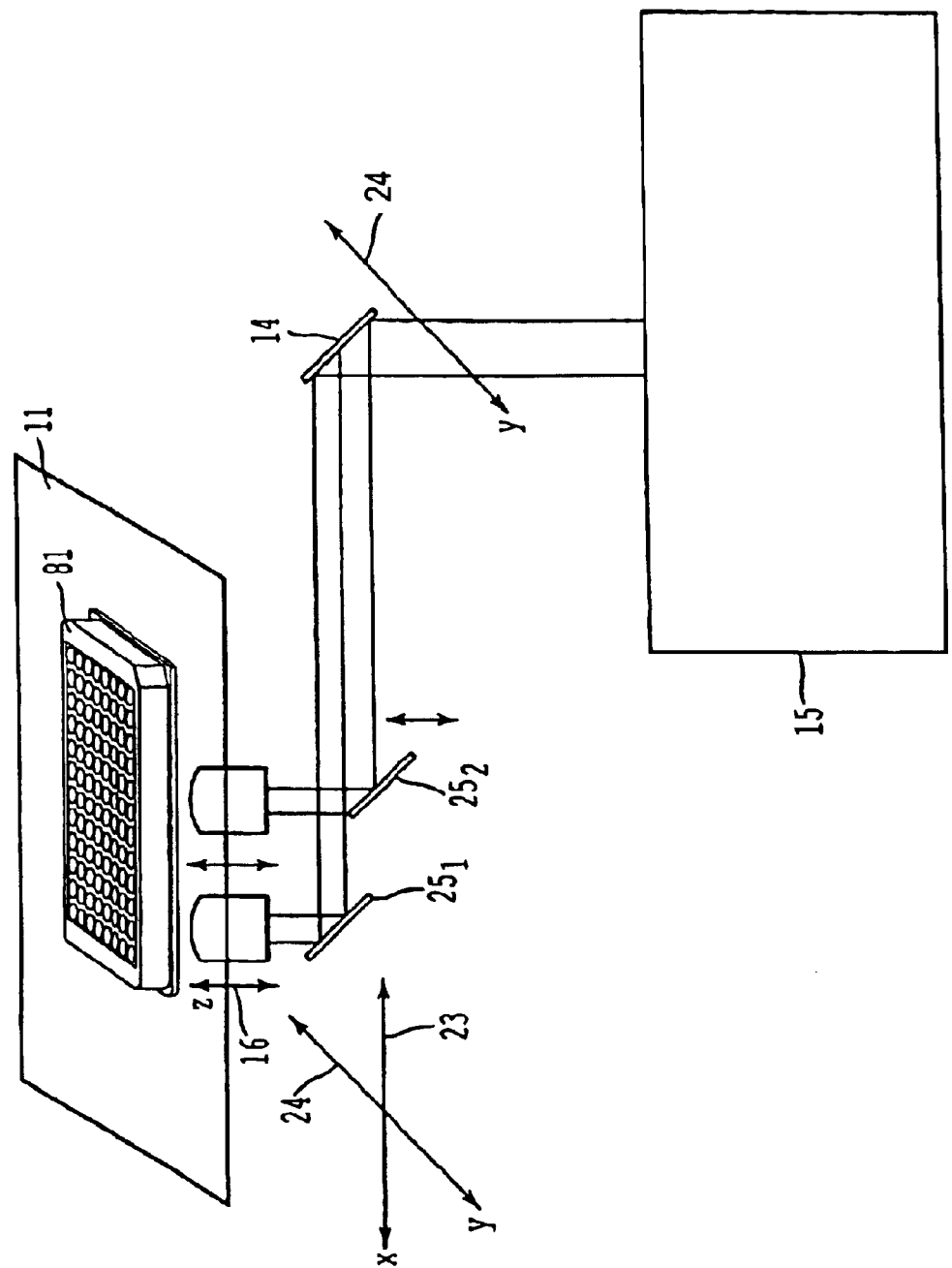
FIG. 7 shows the novel microscope of the present invention in a further embodiment.

A further embodiment of the present invention is shown in FIG. 7 which shows essentially two cascaded sample viewing optics. The device shown in FIG. 7 provides a significant benefit that a sample can be viewed at two different points in parallel and such that an image provided at a viewing part can be split so that half of the image shows the first portion of the sample and half the image shows the second portion of the sample. That operation is achieved in the embodiment of FIG. 7 by cascading two of the sample viewing optics such as shown individually in FIG. 2. Specifically, in the embodiment of FIG. 7, two mirrors $25_1$ and $25_2$ are provided to each receive half of an input light beam by being slightly displaced from each other. As a result, the images of viewing the sample are each reflected off the reflected mirrors $25_1$, $25_2$ and provided to a viewing point in the microscope 15 (shown as viewing point 47 in the microscope 15 shown in FIG. 5) so that at the viewing point the image will be split in two with each half showing a half of the sample in the slide 12. Further, in the specific embodiment shown in FIG. 7, the image signals reflected off mirrors $25_1$ and $25_2$ are then reflected off mirror 14 and passed through a dichroic beam splitter 41, through emission filter 43 and tube lens 45, and onto an observation point 47. The observation point 47 could be a final image point or an intermediate image position point where a Nipkow disk is placed, as a further example.

In a further embodiment of the present invention, the two objectives $13_1$, $13_2$ can be of the same power or different power, giving the possibility of simultaneously observing the slide or object under observation at two magnifications. This could have great advantage in a variety of applications allowing for observation of, for example, cellular organization and different cell types in a tissue slide (with a lower power objective) and detailed cell structure of the individual cells making up the tissue (with a higher power objective). Another advantage of the two objectives depicted in this invention is to scan the wells of a multiwell plate 81 at different magnifications. While the specific embodiment is shown for two objectives, the same concept can be applied to a plurality of objectives only limited by the optical resolution due to splitting the field into multiple images.

Figure 8:
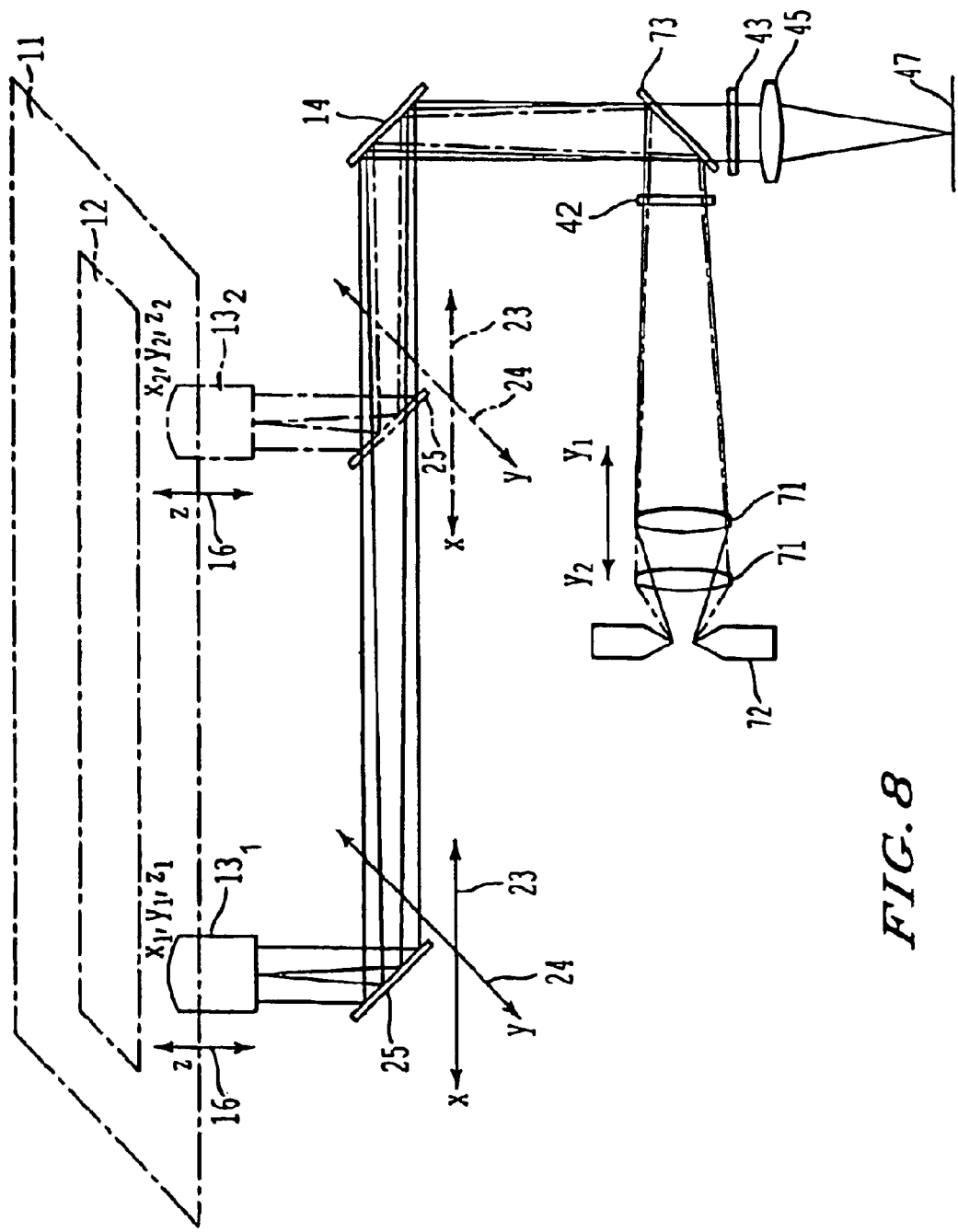
FIG. 8 shows the novel microscope of the present invention in a further embodiment.

A further embodiment of the present invention is shown in FIG. 8 which shows a single objective 13 positioned at two different x,y,z positions ($x_1,y_1,z_1$ and $x_2,y_2,z_2$) on slide 12 positioned on stage 11. The device shown in FIG. 8 depicts an objective 13 at different distances from the reflected light illumination source 72 which provides the energy for epi-illumination in fluorescence microscopy. Because when the objective 13 is at different positions from the source, the focus of back aperture illumination of the objective 13 will be different at positions $x_1,y_1,z_1$ and $x_2,y_2,z_2$. To obtain optimal illumination efficiency it would be desirable to have the focus position of illumination source 72 constant at all x,y,z positions which is independent of the distance between the objective 13 and the illumination source 72. Further, in the embodiment shown in FIG. 8, light is provided from a light source 72 which can, as one example, take the form of an arc lamp. That light is passed through a collector 71 which focuses the illumination light upon the back aperture of the objective 13. In this example, collector 71 in position $Y_1$ focuses the illumination light upon the back aperture of objective 13 shown in position $x_1,y_1,z_1$. When the objective 13 is moved to position $x_2,y_2,z_2$ (shown in dashed lines), then moving the collector 71 to position $Y_2$ (shown in dashed lines) adjusts the illumination to the back aperture of the microscope objective now in position $x_2,y_2,z_2$. Such a structure ensures proper positioning of light output from the light source 72 on the objective 13. Further, that light passes through an emission filter 42 and reflects off of the dichroic beam splitter 73. Thus, the dichroic beam splitter 73 has a structure to reflect light from the light source 72 and to pass reflected light from the mirror 14. The light reflected off the dichroic beam splitter 73 is then reflected off mirrors 14, 25, 25 and imaged onto the objective 13.

Each of the embodiments in the present invention can also provide significant benefits when the sample is in fact multiple samples provided in a multi-well plate. For example as shown in FIG. 7 of the present specification, on the stage 11 may be provided a multi-well plate 81. That multi-well plate 81 may be, as one example only, a 96 well plate, which is a standard plate. However, a number of wells provided in the multi-well plate 81 may be varied. In FIG. 8 the multi-well plate 81 is shown utilized in a system with cascaded optics. However, it should be clear that in any of the embodiments of the present invention noted above, the slide 12 can be replaced with multi-well plate 81.

One of the benefits of the system of the present invention particularly useful in evaluating samples placed in multi-well plates is that real time kinetic observations can be made during a reaction. For example, it may often arise in evaluating samples stored in multi-well plates that each sample has a specific reactant pipetted therein. In a background system in which a sample is moved to be placed underneath an objective, constantly moving the different samples in a multi-well plate underneath an objective may have significant drawbacks. Specifically, it may be the case that the movement of the multi-well plate itself upsets the samples so that time will be required prior to viewing each sample so that the sample can recover from its movement. That would significantly reduce the throughput in evaluating samples within a multi-well plate. The present invention overcomes that drawback in that the multi-well plate can be held stationary and the accompanying optics instead are moved. Therefore, no down time is required to allow a sample to settle.

That benefit in the present invention may also be particularly useful to examine in real time kinetic reactions in the samples in the multi-well plate. In that instance in the present invention after a reactant is provided to one or more samples in the multi-well plate the reaction can be immediately viewed without having to upset the sample.

Further, in the system of the present invention as shown in FIG. 7 in which plural cascaded optics are used, throughput in viewing the samples in the multi-well plate can be significantly enhanced. That results from being able to view twice as many samples in the same period of time in the specific embodiment of FIG. 7. If more optics are cascaded, for example if 4 or 8 optics are cascaded, even further improvements in throughput can be achieved.

In the embodiment shown in FIG. 7, it is also indicated that one of the mirrors 25, specifically mirror $25_2$, is moveable in the Z direction. That structure in FIG. 7 provides the added benefit of being able to change how much of two different samples are viewed.

It is clear that many modifications could be made to any of the embodiments along the lines of different microscope operation. As examples, the microscope could operate in widefield or confocal, a point scanner system could be utilized, and a laser or filament source could be provided as a transmitted light source.

Further, the embodiments noted above have all been disclosed in the context of a microscope. However, it should be apparent to those of ordinary skill in the art that the teachings of the present invention could be applied to other optical systems that may fall outside the scope of description as a microscope.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A microscope optical system for viewing a stationary sample comprising:
   (a) microscope optics, including a stationary viewing point configured to view an image of said stationary sample;
   (b) an objective movable in x, y, and z directions;
   (c) first intermediate optics positioned between said sample and said microscope optics and configured to be repositioned to view multiple fields of view on said sample while said sample and said microscope optics are stationary, wherein said first intermediate optics includes:
      (c1) a first mirror movable in the x and y directions and coupled to said objective with movement in the x and y directions; and
      (c2) a second mirror moveable in the y direction and coupled to said first mirror with movement in the y direction; and
   (d) a light source configured to pass light through said sample, wherein said light source is moveable in the x and y directions and is coupled to said objective with movement in the x and y directions.

2. The microscope optical system in accordance with claim 1, wherein the system is capable of confocal imaging.

3. The microscope optical system in accordance with claim 2, wherein said microscope optical system includes a spinning disk.

4. The microscope optical system in accordance with claim 1, wherein the sample is contained in multiple well plates.

5. The microscope optical system in accordance with claim 1, wherein the sample is positioned above the microscope optics.

6. A microscope optical system for viewing a stationary sample comprising:
   (a) microscope optics, including a stationary viewing point configured to view an image of said stationary sample;
   (b) a first intermediate optics positioned between said sample and said microscope optics and configured to be repositioned to view multiple fields of view on said sample while said sample and said microscope optics are stationary; and
   (c) at least one second intermediate optics cascaded with said first intermediate optics and positioned between said sample and said microscope optics and configured to view multiple further fields of view on said sample while said sample and said microscope optics are stationary.

7. A microscope optical system according to claim 6, further comprising at least one objective moveable in x, y, and z directions, wherein said first and said second intermediate optics each include:
   a first mirror movable in the x and y directions and coupled to said objective with movement in the x and y directions; and a second mirror moveable in said y direction and coupled to the first mirror with movement in the y direction.

8. A microscope optical system according to claim 7, wherein said microscope optics include an epi-fluorescence light source.

9. A microscope optical system according to claim 7, further comprising (d) a light source configured to pass light through said sample, and wherein said light source is moveable in the x and y directions and is coupled to said at least one objective with movement in the x and y directions.

10. A microscope optical system according to claim 6, wherein said microscope optics include an epi-fluorescence light source.

11. The microscope optical system in accordance with claim 6, wherein the system is capable of confocal imaging.

12. The microscope optical system in accordance with claim 11, wherein said microscope optical system includes a spinning disk.

13. The microscope optical system in accordance with claim 6, wherein the sample is contained in multiple well plates.

14. The microscope optical system in accordance with claim 6, wherein the sample is positioned above the microscope optics.

15. A microscope optical system for viewing a stationary sample comprising:
   (a) viewing means for viewing an image of said stationary sample;
   (b) objective means for focusing on said sample and being movable in x, y, and z directions;
   (c) first optics means positioned between said sample and said viewing means for viewing multiple fields of view on said sample while said sample and said viewing means are stationary, wherein said first optics means includes:
      (c1) a first imaging means, moveable in the x and y directions and coupled to said objective means with movement in the x and y directions, for propagating an image from said objective means; and
      (c2) a second imaging means, moveable in the y direction and coupled to said first imaging means with movement in the y direction, for propagating an image from said objective means and from said first imaging means; and
   (d) light source means for passing light through said sample, wherein said light source means is moveable in the x and y directions, and is coupled to said objective means with the movement in the x and y directions.

16. A microscope optical system for viewing a stationary sample comprising:
   (a) viewing means for viewing an image of the stationary sample;
   (b) first optics means positioned between said sample and said viewing means for viewing multiple fields of view on said sample while said sample and said viewing means are stationary; and
   (c) second optics means cascaded with said first optics means and positioned between said sample and said viewing means for viewing multiple further fields of view on said sample while said sample and said viewing means are stationary.

17. A microscope optical system according to claim 16, wherein each of said first and second optics means include:
   (bc1) objective means for focusing on said sample and being moveable in x, y, and z directions;
   (bc2) first imaging means, moveable in the x and y directions and coupled to said objective means with movement in the x and y directions, for propagating an image from said objective means; and
   (bc3) second imaging means, movable in the y direction and coupled to said first imaging means with movement in the y direction, for propagating an image from said objective means and from said first imaging means.

18. A microscope optical system according to claim 17, wherein said viewing means includes an epi-fluorescence light source.

19. A microscope optical system according to claim 17, further comprising light source means for passing light through said sample, and where said light source means is moveable in the x and y directions, and is coupled to one of said objective means with the movement in the x and y directions.

20. A microscope optical system according to claim 16, wherein said viewing means includes an epi-fluorescence light source.

* * * * *